United States Patent
Brandon et al.

(10) Patent No.: US 10,325,230 B2
(45) Date of Patent: Jun. 18, 2019

(54) METHODS AND SYSTEMS FOR AUDITING OVERSTOCK IN A RETAIL ENVIRONMENT

(71) Applicant: Walmart Apollo, LLC, Bentonville, AR (US)

(72) Inventors: Justin Lynn Brandon, Bentonville, AR (US); Marc Ashley Fletter, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 555 days.

(21) Appl. No.: 15/012,224

(22) Filed: Feb. 1, 2016

(65) Prior Publication Data

US 2016/0224916 A1    Aug. 4, 2016

Related U.S. Application Data

(60) Provisional application No. 62/110,976, filed on Feb. 2, 2015.

(51) Int. Cl.
*G06Q 10/00* (2012.01)
*G06Q 10/06* (2012.01)
*G06Q 10/08* (2012.01)

(52) U.S. Cl.
CPC ..... *G06Q 10/06312* (2013.01); *G06Q 10/087* (2013.01)

(58) Field of Classification Search
None
See application file for complete search history.

(56) References Cited

U.S. PATENT DOCUMENTS

| | | | | |
|---|---|---|---|---|
| 5,379,422 A | * | 1/1995 | Antoshenkov | .... G06F 17/30327 |
| 5,557,513 A | * | 9/1996 | Frey | .................... G06Q 10/0631 |
| | | | | 705/16 |
| 6,275,824 B1 | * | 8/2001 | O'Flaherty | ......... G06F 21/6227 |
| 6,338,053 B2 | * | 1/2002 | Uehara | ................. G06Q 10/087 |
| 7,113,922 B2 | * | 9/2006 | Fowler | ................. G06Q 10/087 |
| | | | | 705/22 |

(Continued)

OTHER PUBLICATIONS

Yenning Gong (Stochastic Modelling and Analysis of Warehouse Operations Stochastische modellering en analyse van magazijnoperaties, Thesis, 2009) (Year: 2009).*

(Continued)

*Primary Examiner* — Hafiz A Kassim
(74) *Attorney, Agent, or Firm* — McCarter & English, LLP; David R. Burns

(57) ABSTRACT

Exemplary embodiments of the present disclosure are related to auditing overstock products in a retail environment. A database query is constructed to retrieve employee schedule information for a specified time period from a database. A first data structure is created that includes an audit list of employees scheduled to work during the specified time period in response to database records returned by the database in response to the submission of the database query. A pseudo-random sorting function is executed to randomize a position of the employees in the audit list. A second data structure is created that includes audit data generated in response to an overstock audit. A report is generated based on the audit data and includes at least one visual representation of the audit data.

14 Claims, 11 Drawing Sheets

(56) References Cited

U.S. PATENT DOCUMENTS

| | | | | |
|---|---|---|---|---|
| 7,495,558 | B2* | 2/2009 | Pope | G01K 1/024 340/572.1 |
| 7,720,804 | B2* | 5/2010 | Fazal | G06F 16/248 707/601 |
| 7,953,766 | B2* | 5/2011 | Gong | G06Q 10/087 707/736 |
| 8,015,117 | B1* | 9/2011 | Lillibridge | G06Q 20/382 705/64 |
| 8,073,836 | B2* | 12/2011 | McNall | G06F 16/2428 707/713 |
| 8,175,925 | B1* | 5/2012 | Rouaix | G06Q 20/203 705/22 |
| 8,321,303 | B1* | 11/2012 | Krishnamurthy | G06Q 10/087 705/28 |
| 8,606,658 | B2* | 12/2013 | Borom | G06Q 10/087 705/28 |
| 8,620,707 | B1* | 12/2013 | Belyi | G06Q 10/087 705/28 |
| 2003/0032409 | A1* | 2/2003 | Hutcheson | G06Q 30/02 455/414.1 |
| 2003/0046121 | A1* | 3/2003 | Menninger | G06Q 10/06 705/7.29 |
| 2003/0097383 | A1* | 5/2003 | Smirnov | G06Q 10/10 |
| 2003/0216969 | A1* | 11/2003 | Bauer | G06K 7/0008 705/22 |
| 2004/0099736 | A1* | 5/2004 | Neumark | G01S 5/04 235/385 |
| 2004/0267703 | A1* | 12/2004 | McEnery | G16H 10/60 |
| 2005/0004831 | A1* | 1/2005 | Najmi | G06Q 10/06 705/7.22 |
| 2005/0246183 | A1* | 11/2005 | Bhalgat | G06Q 10/00 379/114.14 |
| 2006/0031148 | A1* | 2/2006 | O'Dell | G06K 17/0022 705/28 |
| 2006/0195562 | A1* | 8/2006 | Eisenson | G06Q 10/087 709/223 |
| 2006/0212491 | A1* | 9/2006 | Agrawal | G06F 21/6227 |
| 2006/0242154 | A1* | 10/2006 | Rawat | G06F 17/30126 |
| 2007/0112651 | A1* | 5/2007 | Swan | G06Q 10/087 705/28 |
| 2007/0235465 | A1* | 10/2007 | Walker | G06Q 10/087 221/9 |
| 2008/0027834 | A1* | 1/2008 | Meyer | G06Q 10/087 705/28 |
| 2008/0195964 | A1* | 8/2008 | Randell | G06Q 10/06 715/772 |
| 2010/0070333 | A1* | 3/2010 | Musa | G06Q 10/087 705/28 |
| 2011/0004513 | A1* | 1/2011 | Hoffberg | G06Q 30/0207 705/14.1 |
| 2011/0029370 | A1* | 2/2011 | Roeding | G06Q 30/00 705/14.38 |
| 2011/0184776 | A1* | 7/2011 | Spradling | G06Q 10/0635 705/7.28 |
| 2011/0295413 | A1* | 12/2011 | Hara | G06Q 10/087 700/216 |
| 2012/0233041 | A1* | 9/2012 | O'Dell | G06K 17/0022 705/28 |
| 2012/0281095 | A1* | 11/2012 | Trenciansky | G06Q 10/00 348/159 |
| 2013/0036110 | A1* | 2/2013 | Scott | G06F 17/30 707/722 |
| 2014/0344118 | A1* | 11/2014 | Parpia | G06Q 10/087 705/28 |
| 2016/0110679 | A1* | 4/2016 | Putnam | G06Q 10/087 705/28 |

OTHER PUBLICATIONS

Zeynep Ton and Ananth Raman (The Effect of Product Variety and Inventory Levels on Retail Store Sales: A Longitudinal Study, Production and Operations Management, vol. 19, No. 5, Sep.-Oct. 2010, pp. 546-560) (Year: 2010).*

Suvi Seppala et al. (Developing Reverse Logistics Case: Developing return and reuse process in case organization, Thesis, Jun. 2010). (Year: 2010).*

* cited by examiner

METHODS AND SYSTEMS FOR AUDITING OVERSTOCK IN A RETAIL ENVIRONMENT

CROSS-REFERENCE TO RELATED APPLICATIONS

The present application claims the benefit of priority of U.S. provisional patent application entitled "Methods and Systems for Auditing Overstock In A Retail Environment," which was filed on Feb. 2, 2015, and assigned Ser. No. 62/110,976. The entire content of the foregoing provisional application is incorporated herein by reference.

BACKGROUND

Accurate stocking of products in display areas of a store can help improve productivity of a retail store. When an employee of a retail entity stocks a display area with a product, several issues may exist that prevent and/or hinder the proper stocking of the display area. As a result, products that could not be stocked are returned to the store/back room for storage until the products can be placed in the appropriate display area. The products that could not be stocked, which are returned to the store/back room, are referred to herein as overstock products. Ensuring that the existence of overstock products is not the result of improper stocking and/or issues associated with designated display areas can yield a more efficient inventory management process.

SUMMARY

Exemplary embodiments of the present disclosure provide for monitoring and tracking overstock product inventory based on activities of employees in a physical retail environment to identify and resolve stocking issues that prevent placement of overstock products in their designated display areas on a sales floor of a retail store. Exemplary embodiments can facilitate randomized auditing of employee overstock products during a specified time period and can generate one or more reports based on the auditing.

In accordance with embodiments of the present disclosure, a method of auditing overstock products in a retail environment is disclosed. The method includes constructing a database query to retrieve employee schedule information for a specified time period from a database; creating a first data structure that includes an audit list of employees scheduled to work during the specified time period in response to database records returned by the database in response to the submission of the database query; executing a pseudo-random sorting function to randomize a position of the employees in the audit list; creating a second data structure that includes audit data generated in response to an overstock audit; and generating a report based on the audit data that includes at least one visual representation of the audit data.

In accordance with embodiments of the present disclosure, a non-transitory computer-readable medium that stores instructions executable by a processing device is disclosed. Execution of the instructions by the processing device causes the processing device to construct a database query to retrieve employee schedule information for a specified time period from a database; create a first data structure that includes an audit list of employees scheduled to work during the specified time period in response to database records returned by the database in response to the submission of the database query; execute a pseudo-random sorting function to randomize a position of the employees in the audit list; create a second data structure that includes audit data generated in response to an overstock audit; and generate a report based on the audit data that includes at least one visual representation of the audit data.

In accordance with embodiments of the present disclosure observational data associated with one or more overstock products can be received via data entry areas in a graphical user interface, and the observational data can be converted into the audit data.

In accordance with embodiments of the present disclosure, an audit form that includes observational information can be scanned to convert the observational information to audit data having a computer-readable format.

In accordance with embodiments of the present disclosure, at least a subset of the audit list can be rendered in a graphical user interface; a selectable link for each employee included in the audit list can be generated; a selection of the selectable link for one of the employees can be received; and one or more further graphical user interfaces specific to the employee can be rendered. Input from a user can be received via the one or more further graphical user interface and a scanner can be controlled to scan a product identifier associated with an overstock products to obtain product identifying information in a computer-readable format. A further database query including the product identifying information can be constructed to retrieve inventory information associated with the overstock product from an inventory database, and the inventory information can be rendered in the one or more further graphical user interfaces. Inputs associated with one or more issues of a product display area that prevents placement of the overstock product in the product display area can be received from the user via the one or more graphical user interface.

Any combination and permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF DRAWINGS

Exemplary embodiments of the present disclosure will be understood from the following detailed description when read with the accompanying figures. In the drawings, like reference numerals refer to like parts throughout the various views of the non-limiting and non-exhaustive embodiments of the present disclosure.

DETAILED DESCRIPTION

Exemplary embodiments of the present disclosure provide for monitoring and tracking overstock product inventory based on activities of employees in a physical retail environment to identify and resolve stocking issues that prevent placement of overstock products in a designated display area on a sales floor of a retail store. Exemplary embodiments can facilitate randomized auditing of employees and their overstock products during a specified time period, and can generate one or more reports based on the auditing. In exemplary embodiments, one or more database queries can constructed to retrieve employee schedule information for a specified time period from a schedule database, which can be used to create a data structure that includes an audit list of employees scheduled to work during the specified time period. A pseudo-random sorting function can be executed to randomize a position of the employees in the audit list. Another data structure can be created after an overstock audit is completed, and a report can be generated based on the audit data that includes at least one visual representation of the audit data.

Figure 1:
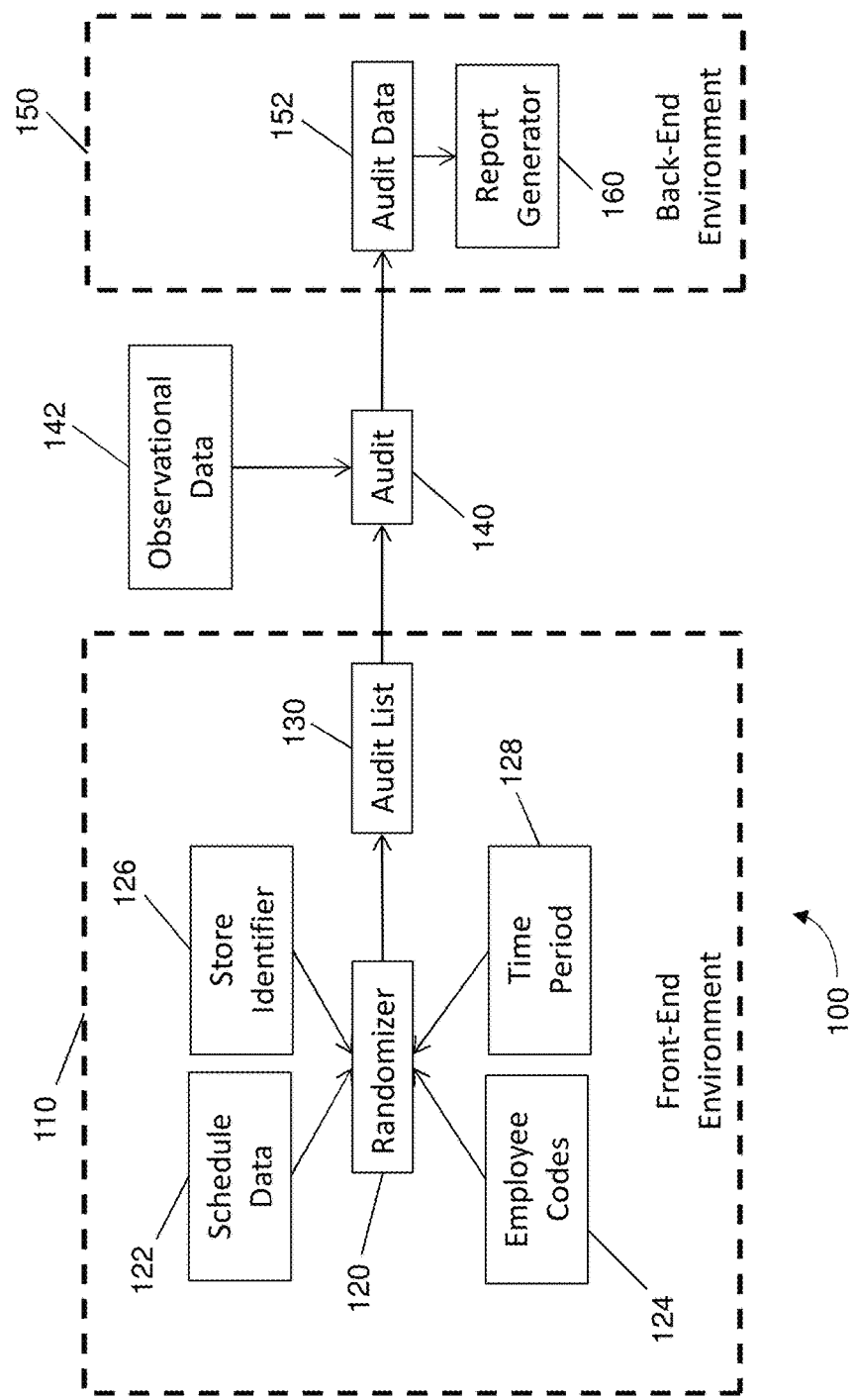
FIG. 1 is a block diagram of an inventory control audit environment in accordance with exemplary embodiments of the present disclosure.

FIG. 1 is a block diagram of an inventory control audit environment 100 in accordance with exemplary embodiments of the present disclosure. The environment 100 can include a front-end environment 110 and a back-end environment 150. In exemplary embodiments, the environment 100 can be implemented to monitor and/or track stocking of items/products (e.g., merchandise) in display areas of a store by one or more employees of a commercial entity (e.g., a retailer) to determine whether inventory is being properly moved from a back/store room to a sales floor display area accessible by customers. Based on this monitoring/tracking, exemplary embodiments of the present disclosure can identify and resolve issues associated with a performance of the employee and/or to identify and resolve issues associated with the display areas at which the products are to be placed.

In some embodiments, the environment 100 can be implemented in combination with a triage system to determine which items/products should be stocked in display areas of the store and which items/products should be moved to the back/store room. For example, the environment 100 can be used to monitor the items/products on the sales floor in the store to determine the sales of the items/products for a period of time, and a random audit can be performed to determine the shelf-cap (e.g., a maximum amount of the item/product that can be displayed on the shelf at one time) of the items/products, indicating whether the items/products can be placed on display on the sales floor. In some embodiments, freight in the back/store room can be scanned and the environment 100 can be implemented to audit the stocking conditions at the sales floor of the store to determine whether the freight in the back/store room can fit on the display on the sales floor. Based on such determinations, the freight can remain in the back/store room or can be at least partially stocked in the display on the sales floor.

The front-end environment 110 can include a randomizer 120 that is configured to receive, in a computer-readable format, employee schedule data 122, employee codes 124, a store identifier 126, and/or a time period 128 during which an audit is to be conducted. The schedule data 122 and/or the employee codes can be stored in one or more databases. For example, the randomizer 120 can receive user input from a graphical user interface (GUI) that includes, for example, the employee codes 124, the store identifier 126, and/or the time period 128 during which the audit is to be conducted (e.g., a week, a month, a year, etc.).

In response to this information, the randomizer 120 can be programmed to construct one or more database queries to retrieve the employee schedule data 122 from a schedule database created via a scheduling system. For example, the randomizer can construct one or more database queries including the employee codes 124, the store identifier 126, and/or the time period 128 during which the audit is to be conducted, and the schedule database can return database records corresponding to the employee codes 124, the store identifier 126, and/or the time period 128 during which the audit is to be conducted. The database records can identify employees scheduled to work during the specified time period 128 (e.g., by name and/or employee number).

The randomizer 120 can process the database records to extract the identity of the employees, and can generate a data structure that includes an audit list 130. The audit list 130 can include a list of employee names and employee numbers. During the formation of the data structure, or after the data structure is formed, the randomizer 120 can be programmed to randomize a position of the employee names in the audit list 130 via a pseudo-random sorting function implemented by the randomizer 120. The randomizer 120 can be programmed to output the audit list 130 to a printer, which can print the audit list 130 for use during an audit. In exemplary embodiments, the randomizer 120 can be executed in response to a task in a task management tool.

During the audit, a user (e.g., a manager) can monitor activities of the employees identified on the audit list according to their order in the audit list 130. For example, the employees identified in the audit list 130 can be overnight stockers at a retail store (e.g., employees with an employ code that corresponds to an overnight stocking positions at the retail store), and the manager can monitor a first group of employees in the audit list 130 during a first day/night shift of the specified time period (e.g., the first four employees in the audit list), can monitor a second group of employees during a second day/night shift of the specified time period (e.g., the next four employees in the audit list 130), and can monitor a third group of employees during a third day/night shift of the specified time period (e.g., the last four employees in the audit list 130).

To monitor an employee identified in the audit list 130, the manager can identify overstock products (e.g., products that the employee did not place on the sales floor) that the employee was stocking (e.g., moving from the back/store room to the sales floor). For example, the manager can select a quantity of overstock products and can go to the display area(s) on the sales floor where the overstock products should have been placed. The manager can observe the display area(s) to identify issues as to why the overstock products were not placed on the sales floor. For example, the manager can determine whether there are issues with the inventory management system (e.g., the quantity of the product that can be displayed in the display area is incorrect in an inventory management system, another product is occupying the space in the display area for the product, a label identifying the location in the display area for the product is missing, a capacity of the display area to hold the product is incorrect in the inventory management system, there are multiple display areas within the retail store at which the product is displayed, and the like). Upon observing the display area(s), the manager can fill out an audit form 140 that includes observation data 142 identifying the issues observed by the manager. In some embodiments, the user can enter observation data 142 into the back-end environment 150 via a graphical user interface associated with the back-end environment 150, and/or the audit form 140 can be scanned by a scanner (an image capture device and/or a bubble sheet reader) to extract the observational data 142 from the audit form 140.

The back-end environment 150 can generate overstock audit data 152 by converting the observational data 142 entered into the GUI by the manager and/or by converting the scanned observational into a computer-readable format (e.g., a binary of alphanumeric file). The audit data 152 can be input to a report generator 160 of the back-end environment 150, which can generate one or more data structures based on the audit data 152 including one or more audit reports, where the data structures can be used to form one more charts, graphs, and/or tables to provide a visual output to a user via a display device and/or a printing device.

Figure 2:
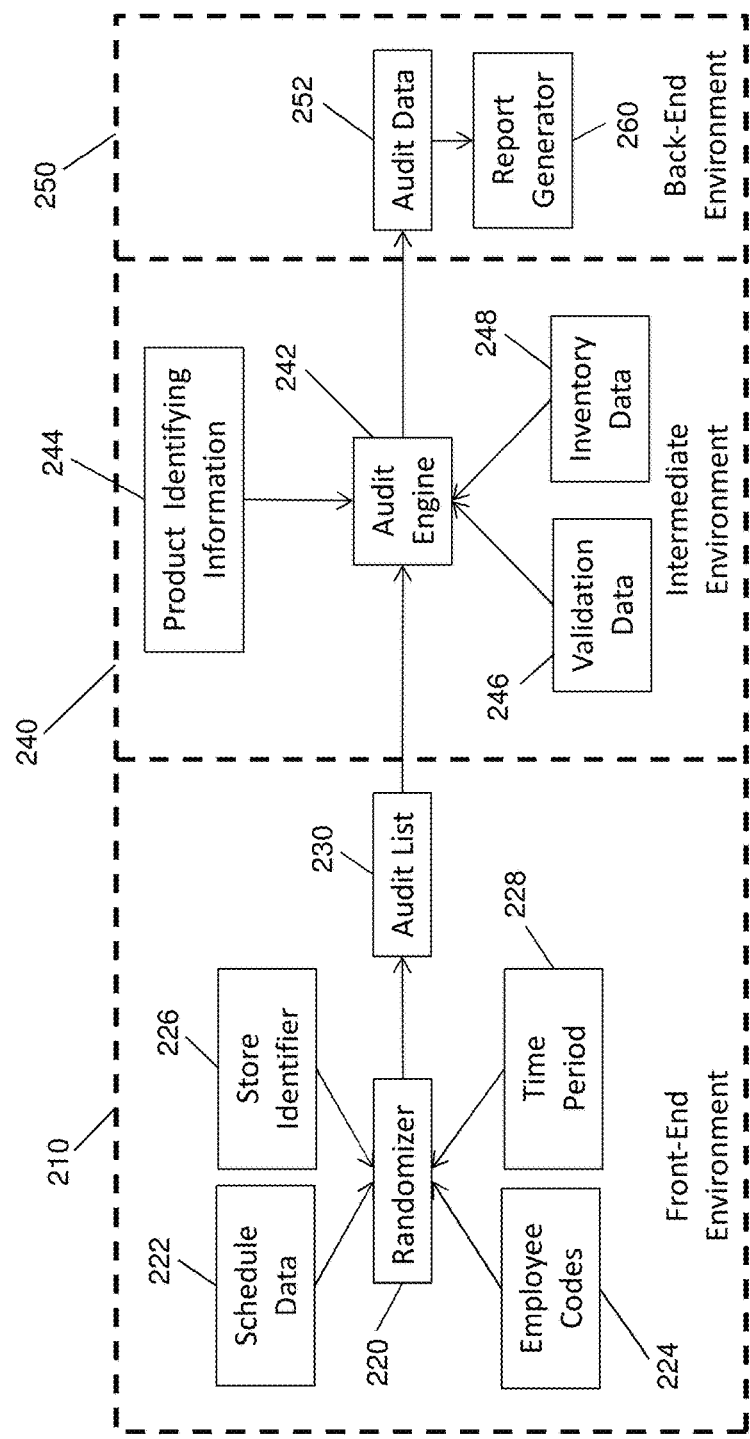
FIG. 2 is a block diagram of another inventory control audit environment in accordance with exemplary embodiments of the present disclosure.

FIG. 2 is a block diagram of another inventory control audit environment 200 in accordance with exemplary embodiments of the present disclosure. The environment 200 can include a front-end environment 210, and intermediate environment 240, and a back-end environment 250. In exemplary embodiments the environment 200 can be implemented to monitor and/or track stocking of items/products (e.g., merchandise) in display areas of a store by one or more employees of a commercial entity (e.g., a retailer) to determine whether inventory is being properly moved from a back/store room to a sales floor display area accessible by customers. Based on this monitoring/tracking, exemplary embodiments of the present disclosure can identify and resolve issues associated with a performance of the employee and/or to identify and resolve issues associated with the display areas at which the products are to be placed.

The front-end environment 210 can include a randomizer 220 that is configured to receive, in a computer-readable format, employee schedule data 222, employee codes 224, a store identifier 226, and/or a time period 228 during which an audit is to be conducted. The schedule data 222 and/or the employee codes can be stored in one or more databases. For example, the randomizer 220 can receive user input from a graphical user interface (GUI) that includes, for example, the employee codes 224, the store identifier 226, and/or the time period 228 during which the audit is to be conducted (e.g., a week, a month, a year, etc.).

In response to this information, the randomizer 220 can be programmed to construct one or more database queries to retrieve the employee schedule data 222 from a schedule database created via a scheduling system. For example, the randomizer 220 can construct one or more database queries including the employee codes 224, the store identifier 226, and/or the time period 228 during which the audit is to be conducted, and the schedule database can return database records corresponding to the employee codes 224, the store identifier 226, and/or the time period 228 during which the audit is to be conducted. The database records can identify employees scheduled to work during the specified time period 228 (e.g., by name and/or employee number).

The randomizer 220 can process the database records to extract the identity of the employees, and can generate a data structure that includes an audit list 230. The audit list 230 can include a list of employee names and employee numbers. During the formation of the data structure, or after the data structure is formed, the randomizer 220 can be programmed to randomize a position of the employee names in the audit list 230 via a pseudo-random sorting function implemented by the randomizer 220. The randomizer 220 can be programmed to input the audit list to an audit engine 242 of the intermediate environment 240. In exemplary embodiments, the randomizer 220 can be executed in response to a task in a task management tool.

The audit engine 242 can be programmed to facilitate monitoring activities of the employees identified on the audit list 230 according to their order in the audit list 230. The employees identified in the audit list 130 can be overnight stockers at a retail store (e.g., employees with an employ code that corresponds to an overnight stocking positions at the retail store). In exemplary embodiments, the audit engine 242 can be programmed to generate one or more graphical user interfaces to render a selectable version of the audit list 230 or a subset of the audit list 230 on a display device to allow a user (e.g., a manager) to select an employee from the audit list 230 or the subset of the audit list 230. In some embodiments, audit engine 242 can be programmed to limit or restrict a selection employees to the order of the audit list such that the user cannot audit the employees out of order. The subset of the audit list can include employees to be audit during a specified day/night shift during the specified time period.

In response to a selection of one of the employees included in the audit list 230 or subset of the audit list 230, the audit engine 242 can be programmed to generate one or more GUIs that can be rendered on a display device viewable by the user. The one or more GUIs that are generated can provide the user with the ability to scan, capture, or otherwise read data associated with one or more overstock products. For example, the audit engine 242 can be configured to control a scanner/reader that is configured to scan, capture, and/or read product identifying information from the overstock products. In some embodiments, the scanner/reader can be implemented as an bar code reader to read bar codes, a quick code reader to read quick codes, an image capture device to capture images, a radio frequency identification (RFID) reader to read RFID tags, and the like.

To monitor an employee selected via the audit engine 242, the manager can identify overstock products (e.g., products that the employee did not place on the sales floor) that the employee was stocking (e.g., moving from the back/store room to the sales floor), and can scan/read product identifying information from one or more of the overstock products (e.g., from a bar code, quick code, RFID tag, and the like associated with the product) via the one or more GUIs of the audit engine 242. After the product identifying information is input to the audit engine 242, the audit engine 242 can create one or more database queries to retrieve inventory information from one or more inventory databases maintained by an inventory system. For example, audit engine 242 can construct a database query to include the product identifying information and submit the query to the inventory database, which can be configured to return, as an input to the audit engine 242, inventory data 248, such as a total quantity of the product in the retail store, one or more display areas in the retail store at which the product is displayed, a quantity of the product in the display area on the sales floor, a quantity of the product being stored in the back/store room, a quantity of the product that was recently delivered or that is scheduled to be delivered, and the like.

The audit engine 242 can provide instructions to display a location at which the one or more overstock products are displayed on the sales floor, and the user can observe the display area(s) to identify issues as to why the overstock products were not placed on the sales floor. For example, the manager can determine whether there are issues with the inventory management system (e.g., the quantity of the product that can be displayed in the display area is incorrect in an inventory management system, another product is occupying the space in the display area for the product, a label identifying the location in the display area for the product is missing, a capacity of the display area to hold the product is incorrect in the inventory management system, there are multiple display areas within the retail store at which the product is displayed, and the like) and/or whether the employee simply failed to properly stock the display area. Upon observing the display area(s), the user can interact with one or more GUIs generated by the audit engine 242 to generate validation data 246 (e.g., by selecting one or more options within the GUIs and/or entering data via one or more data entry areas in the GUIs.

In response to the user input, the audit engine 242 can be configured to generate overstock audit date 252 that can be input to a report generator 260 of the back-end environment 250, which can generate one or more data structures based on the audit data 252 including one or more audit reports, where the data structures can be used to form one or more charts, graphs, and/or tables to provide a visual output to a user via a display device and/or a printing device.

Figure 3:
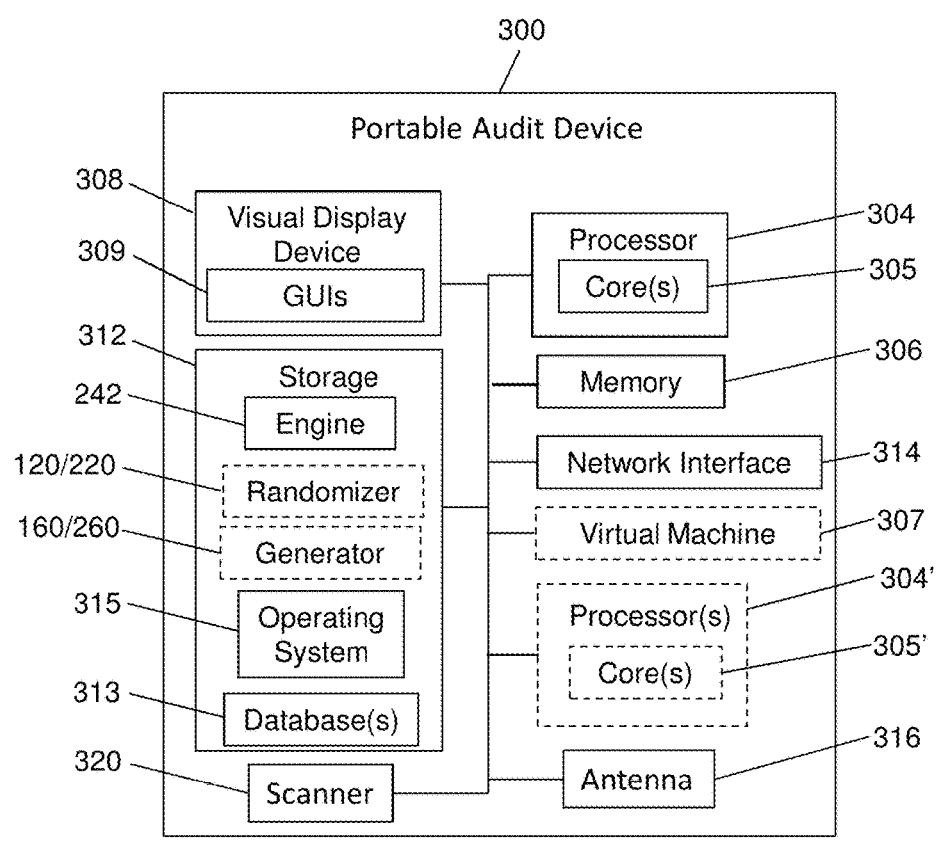
FIG. 3 is a block diagram of a portable audit device in accordance with exemplary embodiments of the present disclosure.

FIG. 3 is a block diagram of a portable audit device 300 in accordance with exemplary embodiments of the present disclosure. In exemplary embodiments, the portable audit device 300 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 306 included in the portable audit device 300 may store computer-readable and computer-executable instructions or software for implementing exemplary embodiments, such as embodiments of the audit engine (e.g., the audit engine 242, the randomizer (e.g., the randomizer 120/220), and/or the report generator (e.g., the report generator 160/260). The portable audit device 300 also includes processor 304 and associated core 305, and optionally, one or more additional processor(s) 304' and associated core(s) 305' (for example, in the case of computer systems having multiple processors/cores), for executing computer-readable and computer-executable instructions or software stored in the memory 306 and other programs for controlling system hardware. Processor 304 and processor(s) 305' may each be a single core processor or multiple core (305 and 305') processor.

Virtualization may be employed in the portable audit device 300 so that infrastructure and resources in the computing device may be shared dynamically. A virtual machine 307 may be provided to handle a process running on multiple processors so that the process appears to be using only one computing resource rather than multiple computing resources. Multiple virtual machines may also be used with one processor.

Memory 306 may include a computer system memory or random access memory, such as DRAM, SRAM, EDO RAM, and the like. Memory 306 may include other types of memory as well, or combinations thereof.

A user may interact with the portable audit device 300 through a visual display device 308, such as a computer monitor, which may display one or more graphical user interfaces (GUIs) 309 that may be provided in accordance with exemplary embodiments. The portable audit device 300 may include other I/O devices for receiving input from a user. For example, in some embodiments, the visual display device 308 can be a touch screen display that allows a user to interact with the GUIs 309 by touching and/or making gestures on the surface of the display screen to control an operation of the portable audit device 300. The portable audit device 300 may include other suitable I/O peripherals.

The portable audit device 300 may also include one or more storage devices 312, such as a hard-drive, CD-ROM, or other computer readable media, for storing data in one or more databases 313, such as schedule data, inventory information, product identifying information, audit data, and the like, and computer-readable instructions and/or software that implement exemplary embodiments described herein.

The portable audit device 300 can include a network interface 314 configured to interface (wirelessly or wired) via one or more network devices with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the portable audit device 300 can include one or more antennas 316 to facilitate wireless communication (e.g., via the network interface) between the portable audit device 300 and a network. The network interface 314 may include a built-in network adapter, network interface card, PCMCIA network card, card bus network adapter, wireless network adapter, USB network adapter, modem or any other device suitable for interfacing the portable audit device 300 to any type of network capable of communication and performing the operations described herein.

The portable audit device 300 may run any operating system 315 capable of running on the portable audit device and performing the operations described herein. In exemplary embodiments, the operating system 315 may be run in native mode or emulated mode. In an exemplary embodiment, the operating system 315 may be run on one or more cloud machine instances. In some embodiments, the portable audit device 300 can be communicatively coupled to the imaging device 160.

In exemplary embodiments, the portable audit device 300 can include a scanner/reader 320 that is configured to scan/read one or more product identifiers (e.g., bar codes, quick codes, and/or RFID tags) associated with products/items (merchandise). For example, the scanner/reader 320 can be a bar code reader, a quick code reader, an RFID tag reader, and the like. The scanner/reader 320 can be controlled by the portable audit device in response to an execution of the audit engine 242 to obtain product identifying information about overstock products.

In exemplary embodiments, the portable audit device 300 may be a custom application-specific device manufactured to facilitate embodiments described, and/or can be a computer system, such as a laptop, handheld computer, tablet computer (e.g., the iPad™ tablet computer), mobile computing or communication device (e.g., the iPhone™ communication device), or other form of computing or telecommunications device that includes an image capture device, is enhanced and/or improved upon by execution of embodiments of the audit engine, randomizer, and report generators described herein and that is capable of communication, and that has sufficient processor power and memory capacity to perform the operations described herein.

Figure 4:
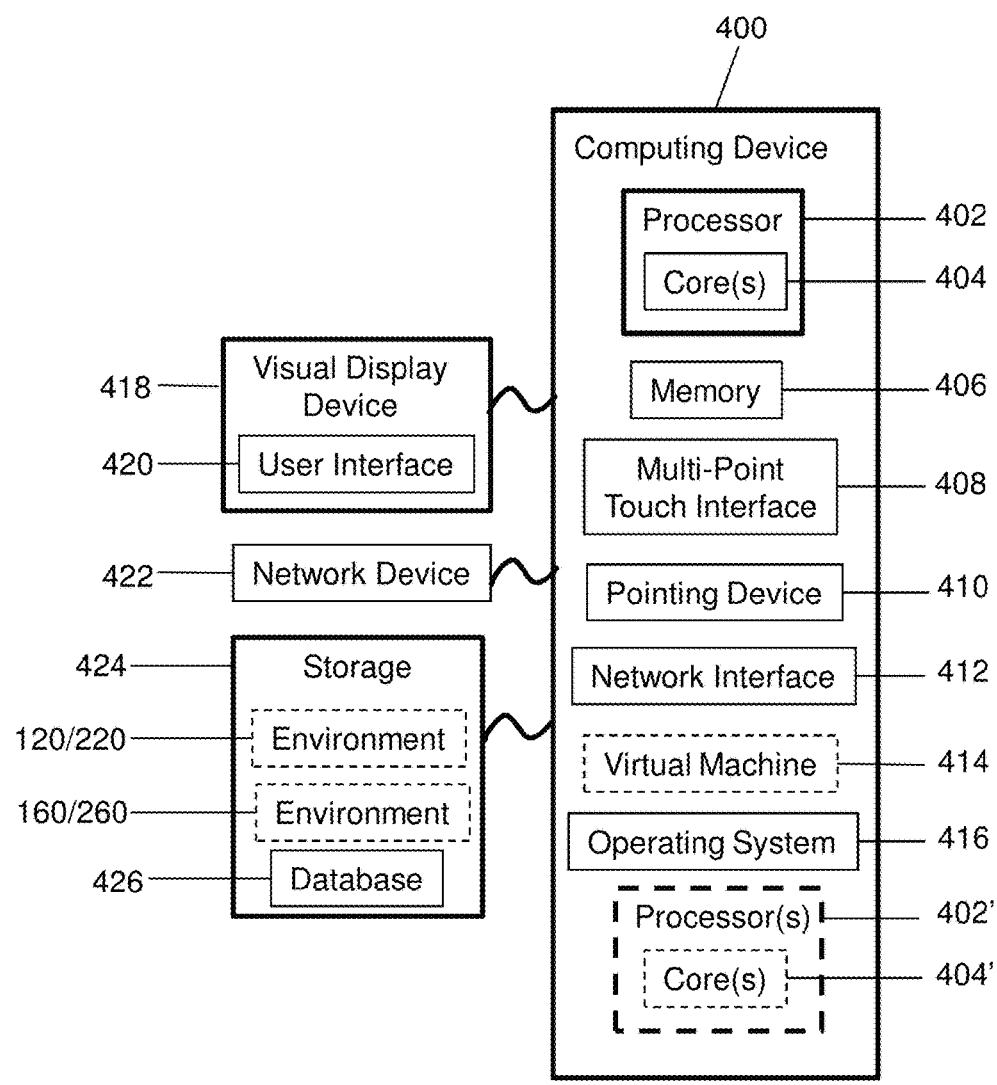
FIG. 4 is a block diagram of a computing device in accordance with exemplary embodiments of the present disclosure.

FIG. 4 is a block diagram of a computing device 400 in accordance with exemplary embodiments of the present disclosure. The computing device 400 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 406 included in the computing device 400 may store computer-readable and computer-executable instructions or software for implementing exemplary embodiments of the present disclosure (e.g., the randomizer 120/220, the generator 160/260). The computing device 400 also includes configurable and/or programmable processor 402 and associated core 404, and optionally, one or more additional configurable and/or programmable processor(s) 402' and associated core(s) 404' (for example, in the case of computer systems having multiple processors/cores), for executing computer-readable and computer-executable instructions or software stored in the memory 406 and other programs for controlling system hardware. Processor 402 and processor(s) 402' may each be a single core processor or multiple core (404 and 404') processor.

Virtualization may be employed in the computing device 400 so that infrastructure and resources in the computing device may be shared dynamically. A virtual machine 414 may be provided to handle a process running on multiple processors so that the process appears to be using only one computing resource rather than multiple computing resources. Multiple virtual machines may also be used with one processor.

Memory 406 may include a computer system memory or random access memory, such as DRAM, SRAM, EDO RAM, and the like. Memory 406 may include other types of memory as well, or combinations thereof.

A user may interact with the computing device 400 through a visual display device 418, such as a computer monitor, which may display one or more user interfaces 420 that may be provided in accordance with exemplary embodiments. The computing device 400 may include other I/O devices for receiving input from a user, for example, a keyboard or any suitable multi-point touch interface 408, a pointing device 410 (e.g., a mouse). The keyboard 408 and the pointing device 410 may be coupled to the visual display device 418. The computing device 400 may include other suitable conventional I/O peripherals.

The computing device 400 may also include one or more storage devices 424, such as a hard-drive, CD-ROM, or other computer readable media, for storing data and computer-readable instructions and/or software that implement exemplary embodiments of the engine 100 described herein. Exemplary storage device 424 may also store one or more databases for storing any suitable information required to implement exemplary embodiments. For example, exemplary storage device 424 can store one or more databases 426 for storing information, such as schedule data, inventory information, product identifying information, audit data, and the like, and computer-readable instructions and/or software that implement exemplary embodiments described herein. The databases 426 may be updated by manually or automatically at any suitable time to add, delete, and/or update one or more items in the databases.

The computing device 400 can include a network interface 412 configured to interface via one or more network devices 422 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 412 may include a built-in network adapter, network interface card, PCMCIA network card, card bus network adapter, wireless network adapter, USB network adapter, modem or any other device suitable for interfacing the computing device 400 to any type of network capable of communication and performing the operations described herein. Moreover, the computing device 400 may be any computer system, such as a workstation, desktop computer, server, laptop, handheld computer, tablet computer (e.g., the iPad™ tablet computer), mobile computing or communication device (e.g., the iPhone™ communication device), or other form of computing or telecommunications device that is capable of communication and that has sufficient processor power and memory capacity to perform the operations described herein.

The computing device 400 may run any operating system 416, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 416 may be run in native mode or emulated mode. In an exemplary embodiment, the operating system 416 may be run on one or more cloud machine instances.

Figure 5:
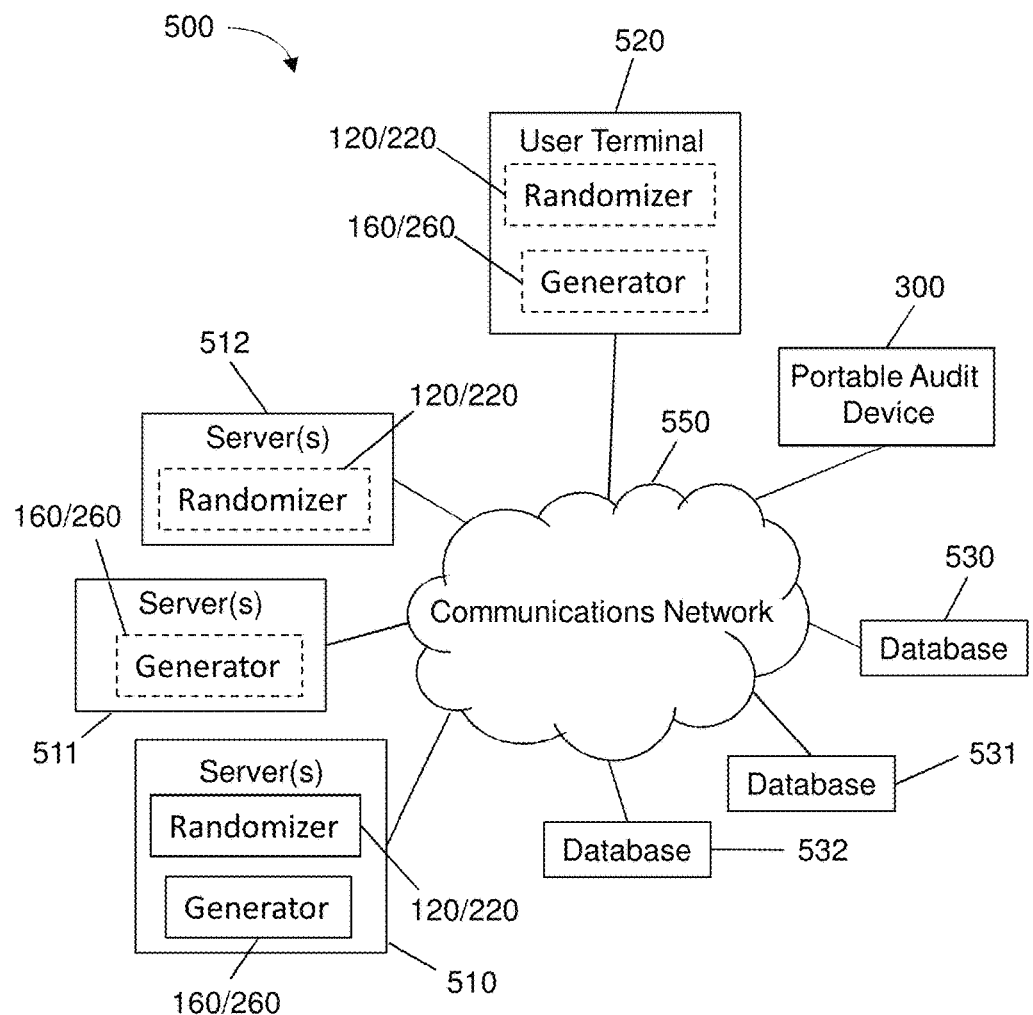
FIG. 5 is a block diagram of exemplary inventory control environments in accordance with exemplary embodiments of the present disclosure.

FIG. 5 is a block diagram of an exemplary inventory control environment 500 in accordance with exemplary embodiments of the present disclosure. The environment can include servers 510-512 operatively coupled to a user terminal 520, a portable audit device 300, via a communication network 550, which can be any network over which information can be transmitted between devices communicatively coupled to the network. For example, the communication network 550 can be the Internet, Intranet, virtual private network (VPN), wide area network (WAN), local area network (LAN), and the like. The computing system 700 can include repositories or database devices 530-532, which can be operatively coupled to the servers 510-512, as well as to user terminal 520 and/or the portable audit device 300, via the communications network 550. In exemplary embodiments, the servers 510-512, user terminal 520, and database devices 530-532 can be implemented as computing devices (e.g., computing device 400). Those skilled in the art will recognize that the database devices 530-532 can be incorporated into one or more of the servers 510-512 such that one or more of the servers can include databases. The database 530 can be an inventory database storing inventory information. The database 531 can be a schedule database storing employee schedule information, and the database 532 can be a overstock audit database storing overstock audit data and/or audit reports. The servers 510-512, user terminal 520, portable audit device 300, and/or the databases 530-532 can be implemented to form a front-end environment (e.g., front-end environments 110, 210), intermediate environment (e.g., intermediate environment 240), and/or back-end environment (e.g., back-end environments 150, 250) described herein.

In some embodiments, embodiments of the server 510 can be configured to implement the randomizer 120/220 and the generator 160/260 or the randomizer and generator can be implemented in a distributed configuration such that the server 511 can implement the generator 160/260 and the server 512 can implement the randomizer 120/220. In some embodiments, the user terminal 520 can implement the randomizer 120/220 and the generator 160/260.

Figure 6:
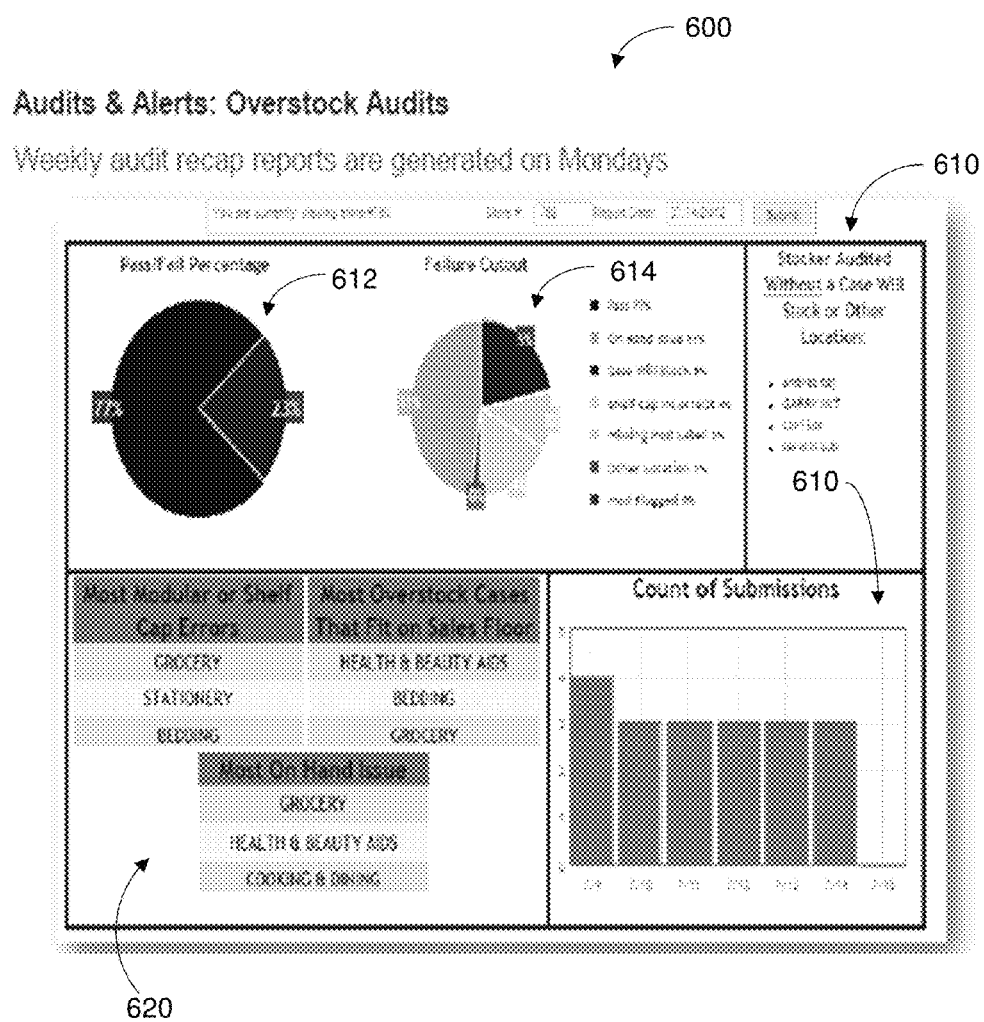
FIG. 6 depicts an audit report that can be generated according to exemplary embodiments of the present disclosure.

FIG. 6 depicts an overstock audit report 600 that can be generated according to exemplary embodiments of the present disclosure. As shown in FIG. 6, the audit report 600 can include one or more charts or graphs 610 and/or can include one or more tables 620 to visually depict results of the audit via a display device. For example, the report can include a chart 612 indicating a pass rate for each overstock audit performed during the specified time period, and a chart 614 indicating the types of audit failures that were identified (e.g., the capacity of the display area for a given product was incorrect in the inventory information maintained by the inventory management system, another product was occupying the space for the given product in the display area, the quantity of the product available in inventory was incorrect in the inventory information maintained by the inventory management system, the label identifying the location within the display area at which the product should be placed was missing, and the like).

Figure 7:
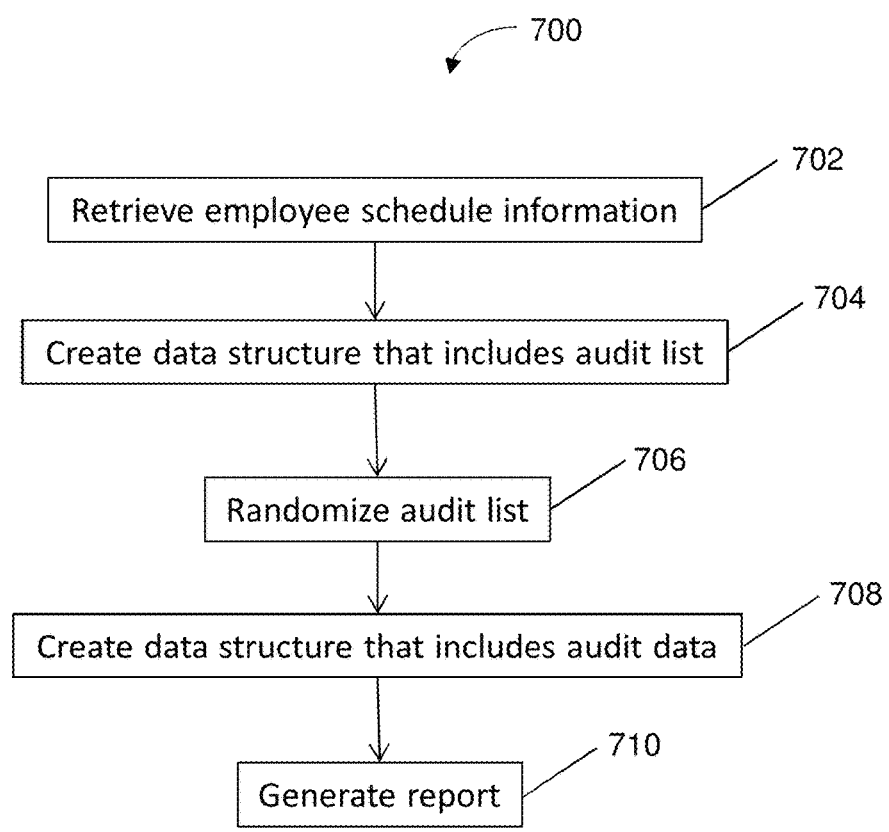
FIG. 7 is a flow chart illustrating an exemplary audit process that can be implemented in accordance with exemplary embodiments of the present disclosure.

FIG. 7 is a flow chart illustrating an exemplary audit process 700 that can be implemented in accordance with exemplary embodiments of the present disclosure. To being, at step 702, a database query can be constructed by the randomizer to retrieve employee schedule information for a specified time period from a schedule database. At step 704, in response to the submission of the database query, the randomizer creates a data structure that includes an audit list of employees scheduled to work during the specified time period. At step 706, a pseudo-random sorting function is executed by the randomizer to randomize a position of the employees in the audit list. The user can use the list to audit employee overstock products to identify any issue that may have prevented the overstock products from being placed in a designated display area. As the user audits the employee overstock products, the user can generate observational data. At step 708, the report generator can create a data structure that includes audit data generated in response to an overstock audit (e.g., based on the observation data). At step 710, the report generator can generate a report based on the audit data that includes at least one visual representation of the audit data.

Figure 8:
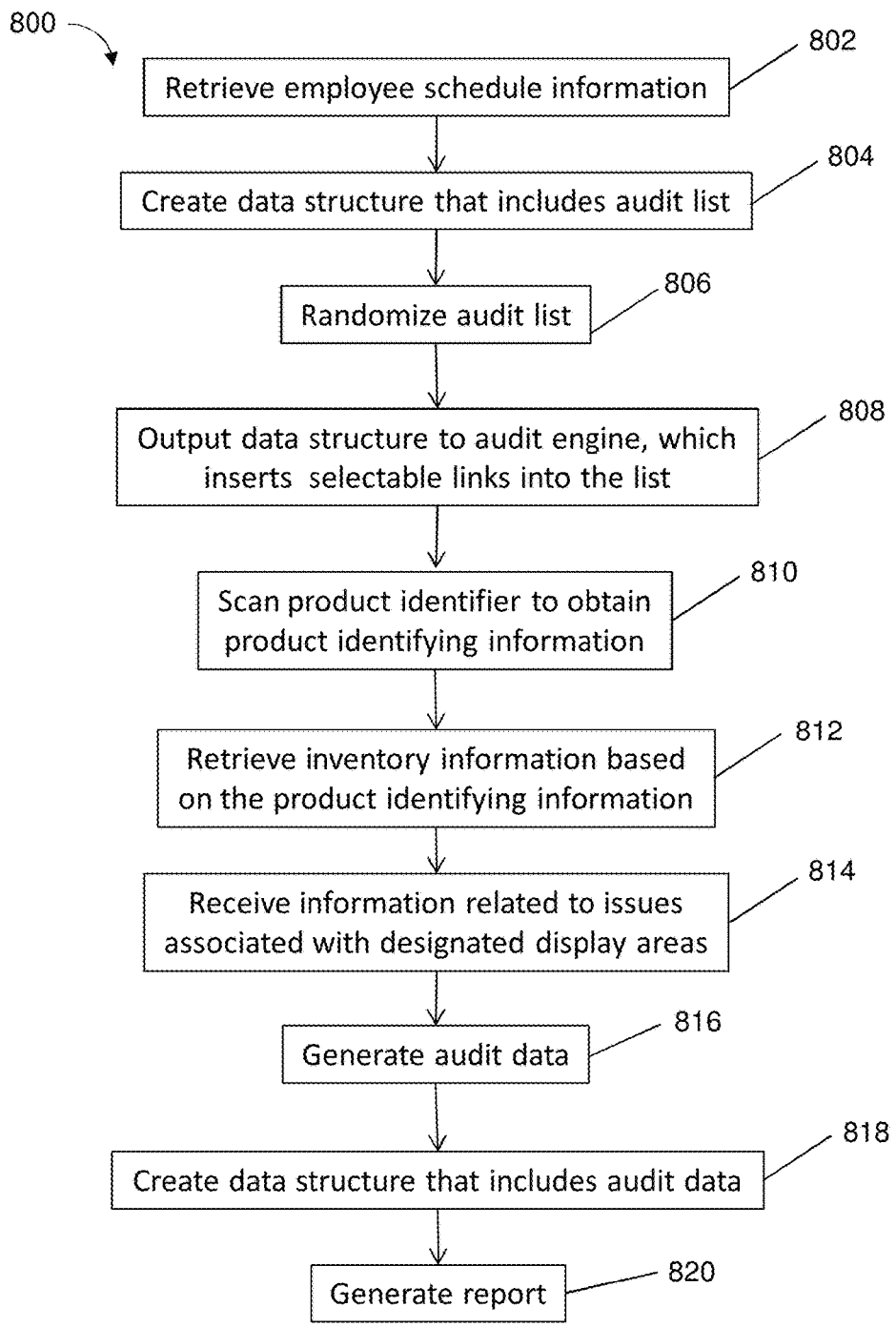
FIG. 8 is a flowchart illustrating another exemplary audit process that can be implemented in accordance with exemplary embodiments of the present disclosure.

FIG. 8 is a flowchart illustrating another exemplary audit process that can be implemented in accordance with exemplary embodiments of the present disclosure. To being, at step 802, a database query can be constructed by the randomizer to retrieve employee schedule information for a specified time period from a schedule database. At step 804, in response to the submission of the database query, the randomizer creates a data structure that includes an audit list of employees scheduled to work during the specified time period. At step 806, a pseudo-random sorting function is executed by the randomizer to randomize a position of the employees in the audit list. At step 808, the randomizer can output the data structure to the audit engine, which can render at least a subset of the audit list in a graphical user interface and can insert a selectable link in the audit list for employee included in the list. The user can select a link in the audit list to navigate to another graphical user interface, which can be used by the user to facilitate scanning a product identifier associated with one of the overstock products that the selected employee was charged with placing in a designated display area on the sales floor. At step 810, in response to an interaction between the user and the graphical user interface, the audit engine can control a scanner to scan a product identifier associated with an overstock product to obtain product identifying information associated with the overstock product. At step 812, the audit engine can construct a database query that includes the product identifying information to retrieve inventory information from an inventory database. At step 814, the audit engine can receive input from the user via the graphical user interface related to issues identified by the user upon observation of the designated display area. At step 816, the audit engine can generate audit data in response to the input received from the user and the inventory information. At step 818, the report generator can create a data structure that includes audit data generated in response to an overstock audit (e.g., based on the observation data). At step 820, the report generator can generate a report based on the audit data that includes at least one visual representation of the audit data.

Figure 9:
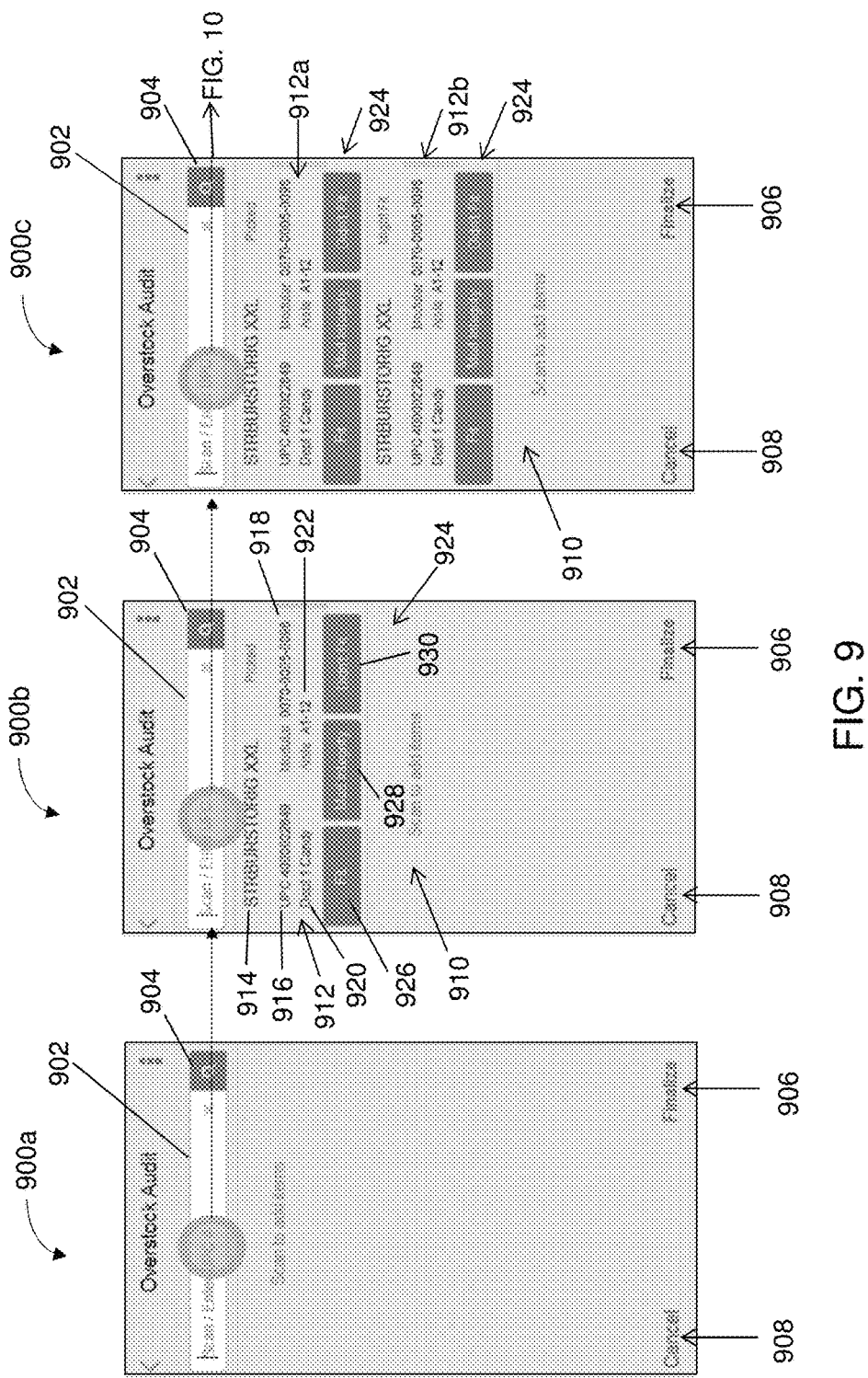
FIG. 9 is a flowchart of exemplary graphical user interface windows of an inventory control audit environment in accordance with exemplary embodiments of the present disclosure.
Figure 10:
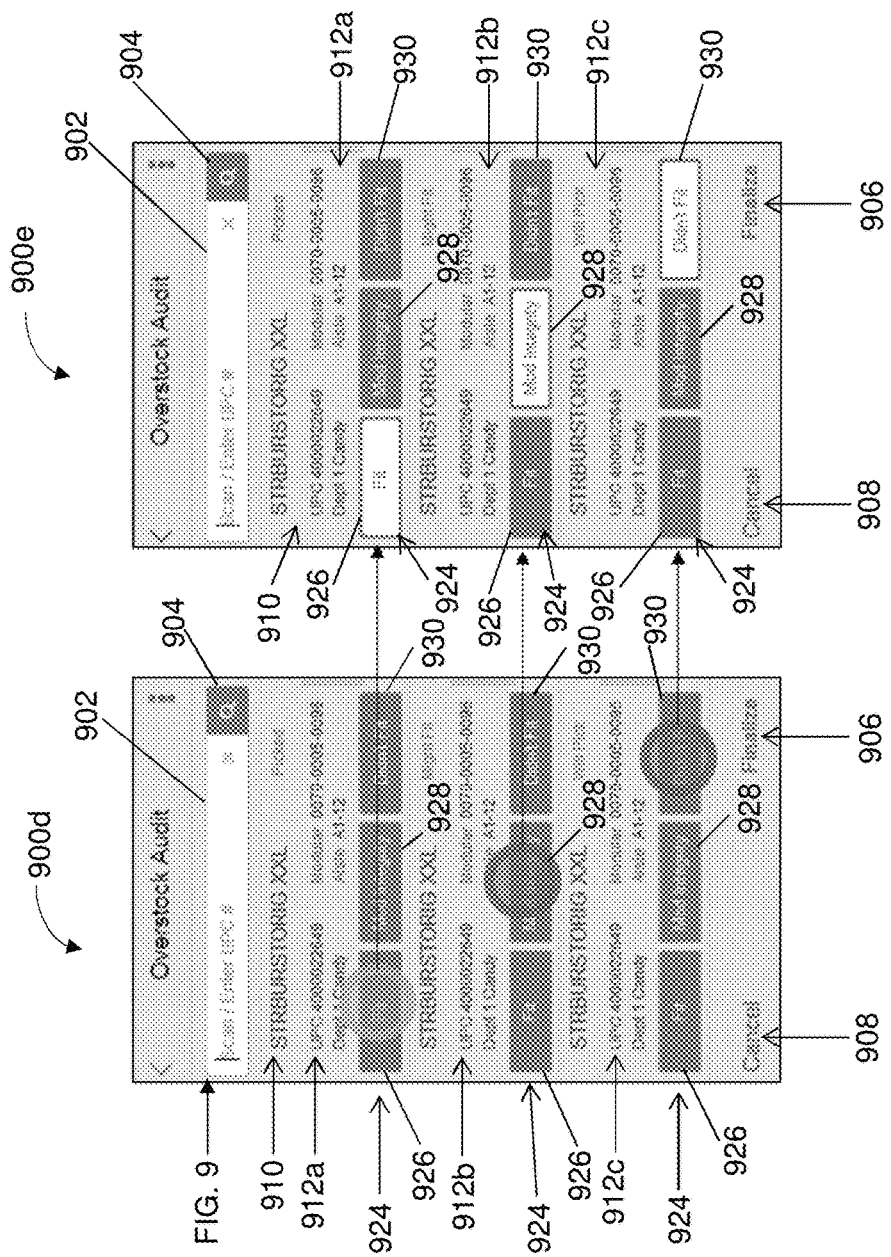
FIG. 10 is a flowchart of exemplary graphical user interface windows of an inventory control audit environment in accordance with exemplary embodiments of the present disclosure.

FIGS. 9 and 10 show graphical user interface windows 900*a-e* that can be implemented in the environment 100 in accordance with exemplary embodiments of the present disclosure. In particular, windows 900*a-e* can be implemented to scan product identifiers to obtain product identifying information and input information relating to issues associated with certain products. For example, window 900*a* provides a graphical user interface for inputting a product identifier (e.g., a universal product code (UPC) number, or the like). An input field 902 can be selected by a user and the product identifier can be input into the input field 902. In some embodiments, a user can manually input the product identifier into the input field 902 and can actuate the search button 904 to initiate a query within a database to retrieve inventory and product identifying information for the product corresponding to the product identifier. In some embodiments, a scanner can be used to scan the product identifier of a product to automatically add the product corresponding to the product identifier to a list of products to be audited. After the desired list of products is generated in the graphical user interface, a finalize button 906 can be actuated to complete inputting the audit data. The audit can be canceled via the cancel button 908.

Window 900*b* of FIG. 9 shows a product listing 910 with a first input product row 912. The input product row 912 can include the product name 914, the product identifier 916, a modular number 918 associated with the product, a department name 920 corresponding to the product, and an aisle 922 in which the product can be located within the store. The input product row 912 can include a product issue status selection 924 that can be used by the auditor to indicate whether the product fits in the proper display (e.g., a fit button 926), there is an issue with the modular integrity of the product (e.g., modular integrity button 928), or if the product does not it in the proper display (e.g., a did not fit button 930). Window 900c shows the product listing 910 with a first input product row 912a and a second input product row 912b, each including a product issue status selection 924 for receiving input from the auditor. It should be understood that the product listing 910 can include any number of products selected to be audited.

FIG. 10 shows graphical user interface windows 900d, 900e that include a product listing 910 with first, second and third input product rows 912a, 912b, 912c. Window 900e shows that the product of the first input product row 912a has been input as fitting in the proper display by actuating the fit button 926, the product of the second input product row 912b has been input as having an issue with the modular integrity of the product by actuating the modular integrity button 928, and the product of the third input product row 912c has been input as not fitting in the proper display by actuating the did not fit button 930. After all of the desired information regarding the products has been input, the finalize button 906 can be actuated to input the data to generate an audit report.

Figure 11:
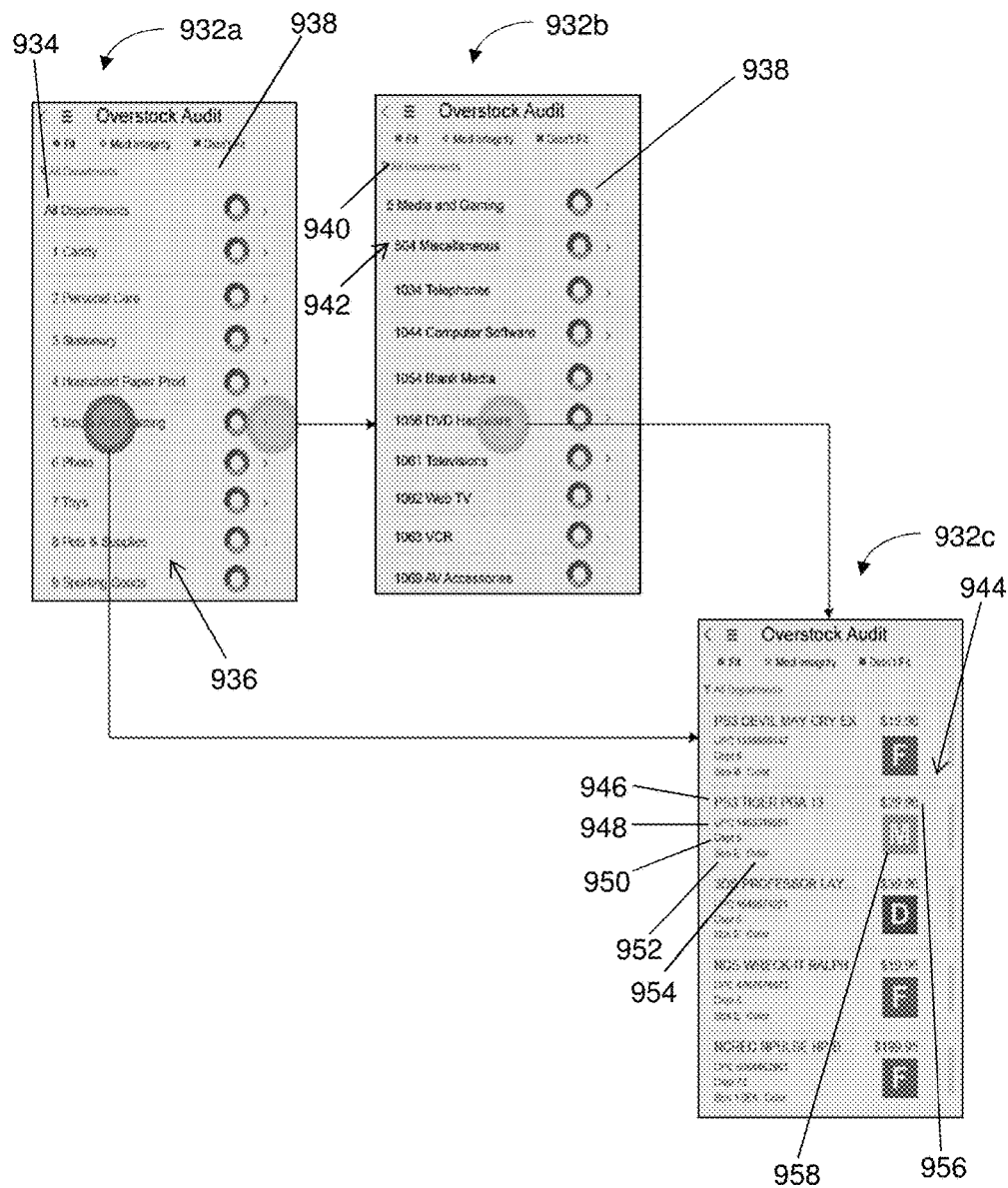
FIG. 11 is a flowchart of exemplary graphical user interface windows of an inventory control audit environment in accordance with exemplary embodiments of the present disclosure.

FIG. 11 shows graphical user interface windows 932a-c providing collected audit data to a user. In particular, after the audit data has been interested for each individual product, the windows 932a-c can be used to provide graphical representations of products in various departments in the store. For example, window 932a can include an all departments selection 934 and a department listing 936 with a plurality of different individual departments within the store. For example, window 932a includes departments, such as candy, personal care, stationary, household paper products, media and gaming, photo, toys, pets and supplies, and sporting goods. It should be understood that the departments are provided as an example and a variety of other department names can be used. The window 932a can provide a visual graphic 938 for all departments and each of the individual departments of the store. The visual graphic 938 can indicate the percentage of products that fit in the proper display, products that have a modular integrity issue, and products that did not fit in the proper display.

Each of the individual departments of the department listing 936 can be selected by the user to investigate the specific department in greater detail. For example, window 932b shows a selection of the media and gaming department. The window 932b shows includes a department selection 940 and sub-department selections 942 that fall within the department selection 940. The department selection 940 includes a visual graphic 938 indicating the audit information for the entire selected department (e.g., media and gaming), and the sub-department selections 942 include individual visual graphics 938 indicating the audit information for the sub-departments (e.g., miscellaneous, telephones, computer software, blank media, DVD hardware, televisions, web TV, VCR, AV accessories, or the like).

Each of the individual sub-department selections 942 can be selected by the user to investigate the specific sub-department in greater detail. For example, window 932c shows a selection of the DVD hardware sub-department. The window 932c includes a product listing 944 with each product including the product name 946, product identifier 948, department name or number 950, product size 952, product color 954, product price 956, and a product audit status 958 (e.g., "F" for a product fitting the display, "M" for a product having an issue with modular integrity, and "D" for a product not fitting the display). Audit data can thereby be viewed by the auditor in a real-time manner.

In describing example embodiments, specific terminology is used for the sake of clarity. For purposes of description, each specific term is intended to at least include all technical and functional equivalents that operate in a similar manner to accomplish a similar purpose. Additionally, in some instances where a particular example embodiment includes a plurality of system elements, device components or method steps, those elements, components or steps may be replaced with a single element, component or step. Likewise, a single element, component or step may be replaced with a plurality of elements, components or steps that serve the same purpose. Moreover, while example embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

Example flowcharts are provided herein for illustrative purposes and are non-limiting examples of methods. One of ordinary skill in the art will recognize that example methods may include more or fewer steps than those illustrated in the example flowcharts, and that the steps in the example flowcharts may be performed in a different order than the order shown in the illustrative flowcharts.

The invention claimed is:

1. A method of auditing overstock products in a retail environment, the method comprising:
   constructing a database query to retrieve schedule information for a specified time period from a database;
   creating a first data structure that includes an audit list of records for the specified time period in response to database records returned by the database in response to the submission of the database query;
   executing a randomizer with a processing device to randomize a position of the records in the audit list via a pseudo-random sorting function;
   rendering at least a subset of the audit list in a graphical user interface;
   creating a selectable link for each record in the audit list;
   executing an audit engine with the processing device to programmatically restrict selection of the records in the audit list to the randomized order of the records output by the pseudo-random sorting function of the randomizer during an overstock audit;
   receiving a selection of the selectable link for one of the records;
   upon selection of the selectable link, navigating the user to one or more further graphical user interfaces specific to the record in real-time;
   receiving input from a user via the one or more further graphical user interface;
   controlling a scanner to scan a product identifier associated with an overstock product to obtain product identifying information in a computer-readable format;
   creating a second data structure that includes audit data generated in response to the overstock audit; and
   generating a report based on the audit data that includes at least one visual representation of the audit data.

2. The method of claim 1, further comprising:
   receiving, via data entry areas in the graphical user interface observational data associated with one or more overstock products; and
   converting the observational data into the audit data.

3. The method of claim 1, further comprising:
scanning an audit form to include observational information to convert the observational information to audit data having the computer-readable format.

4. The method of claim 1, further comprising:
constructing a further database query including the product identifying information to retrieve inventory information associated with the overstock product from an inventory database; and
rendering the inventory information in the one or more further graphical user interfaces.

5. The method of claim 4, further comprising:
receiving input from the user via the one or more graphical user interface associated with one or more issues of a product display area that prevents placement of the overstock product in the product display area.

6. A non-transitory computer-readable medium storing instructions that are executable by a processing device, wherein execution of the instructions by the processing device causes the processing device to:
construct a database query to retrieve schedule information for a specified time period from a database;
create a first data structure that includes an audit list of records for the specified time period in response to database records returned by the database in response to the submission of the database query;
execute a randomizer with a processing device to randomize a position of the records in the audit list via a pseudo-random sorting function;
render at least a subset of the audit list in a graphical user interface;
create a selectable link for each record included in the audit list;
execute an audit engine with the processing device to programmatically restrict selection of the records in the audit list to the randomized order of the records output by the pseudo-random sorting function of the randomizer during an overstock audit;
receive a selection of the selectable link for one of the records;
upon selection of the selectable link, navigate the user to one or more further graphical user interfaces specific to the record in real-time;
receive input from a user via the one or more further graphical user interface;
control a scanner to scan a product identifier associated with an overstock product to obtain product identifying information in a computer-readable format;
create a second data structure that includes audit data generated in response to the overstock audit; and
generate a report based on the audit data that includes at least one visual representation of the audit data.

7. The medium of claim 6, wherein execution of the instructions by the processing device causes the processing device to:
receive, via data entry areas in the graphical user interface observational data associated with one or more overstock products; and
convert the observational data into the audit data.

8. The medium of claim 6, wherein execution of the instructions by the processing device causes processing device to:
scan an audit form to include observational information to convert the observational information to audit data having the computer-readable format.

9. The medium of claim 6, wherein execution of the instructions by the processing device causes processing device to:
construct a further database query including the product identifying information to retrieve inventory information associated with the overstock product from an inventory database; and
render the inventory information in the one or more further graphical user interfaces.

10. The medium of claim 9, wherein execution of the instructions by the processing device causes processing device to:
receive input from the user via the one or more graphical user interface associated with one or more issues of a product display area that prevents placement of the overstock product in the product display area.

11. A system of auditing overstock products in a retail environment, the system comprising:
a schedule database that includes schedule data; and
a portable audit device including a non-transitory computer-readable medium and a processing device, wherein the processing device is configured to execute instructions stored in the non-transitory computer readable medium to:
construct a database query to retrieve schedule information for a specified time period from a schedule database;
create a first data structure that includes an audit list of records for the specified time period in response to database records returned by the database in response to the submission of the database query;
execute a randomizer to randomize a position of the records in the audit list via a pseudo-random sorting function;
render at least a subset of the audit list in a graphical user interface;
create a selectable link for each record included in the audit list;
execute an audit engine to programmatically restrict selection of the records in the audit list to the randomized order of the records output by the pseudo-random sorting function of the randomizer during an overstock audit;
receive a selection of the selectable link for one of the records;
upon selection of the selectable link, navigate the user to one or more further graphical user interfaces specific to the record in real-time;
receive input from a user via the one or more further graphical user interface;
control a scanner to scan a product identifier associated with an overstock product to obtain product identifying information in a computer-readable format;
create a second data structure that includes audit data generated in response to the overstock audit; and
generate a report based on the audit data that includes at least one visual representation of the audit data.

12. The system of claim 11, further comprising:
an inventory database that includes inventory data for products,
wherein the processing device is configured to execute instructions stored in the non-transitory computer readable medium to:
construct a further database query including the product identifying information to retrieve inventory information associated with the overstock product from an inventory database; and render the inventory information in the one or more further graphical user interfaces.

13. The system of claim 12, wherein the processing device is configured to execute instructions stored in the non-transitory computer readable medium to:

receive input from the user via the one or more graphical user interface associated with one or more issues of a product display area that prevents placement of the overstock product in the product display area.

14. The system of claim 11, wherein the portable audit device includes a display device, and wherein the processing device is configured to execute instructions stored in the non-transitory computer readable medium to output the report to the display device.

* * * * *